United States Patent
Singh et al.

(10) Patent No.: US 10,853,139 B2
(45) Date of Patent: Dec. 1, 2020

(54) DYNAMIC WORKLOAD MANAGEMENT BASED ON PREDICTIVE MODELING AND RECOMMENDATION ENGINE FOR STORAGE SYSTEMS

(71) Applicant: EMC IP HOLDING COMPANY LLC, Hopkinton, MA (US)

(72) Inventors: Sweetesh Singh, Benares (IN); Ramesh Doddaiah, Hopkinton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 118 days.

(21) Appl. No.: 16/165,523

(22) Filed: Oct. 19, 2018

(65) Prior Publication Data

US 2020/0125412 A1    Apr. 23, 2020

(51) Int. Cl.
G06F 9/46 (2006.01)
G06F 9/50 (2006.01)
G06F 3/06 (2006.01)

(52) U.S. Cl.
CPC .......... G06F 9/5016 (2013.01); G06F 3/061 (2013.01); G06F 3/067 (2013.01); G06F 3/0608 (2013.01); G06F 3/0647 (2013.01)

(58) Field of Classification Search
None
See application file for complete search history.

(56) References Cited

U.S. PATENT DOCUMENTS

| | | | |
|---|---|---|---|
| 8,112,586 B1 * | 2/2012 | Reiner | G06F 12/0897 711/119 |
| 10,225,162 B1 * | 3/2019 | Jain | G06F 3/0605 |
| 10,514,978 B1 * | 12/2019 | Lee | G06F 11/0793 |
| 2017/0315740 A1 * | 11/2017 | Corsi | G06F 13/4282 |
| 2018/0101316 A1 * | 4/2018 | Bordoli | G06F 3/067 |
| 2019/0213178 A1 * | 7/2019 | Adamson | G06F 12/08 |

* cited by examiner

Primary Examiner — Kenneth Tang
(74) Attorney, Agent, or Firm — Anderson Gorecki LLP (57) ABSTRACT

Allocation of storage array hardware resources between host-visible and host-hidden services is managed to ensure that sufficient hardware resources are allocated to host-visible services. Information obtained from monitoring real-world operation of the storage array is used to generate a model of the storage array. The generated model represents temporal dependencies between storage array hardware, host-visible services, and host-hidden services. Because the model includes information gathered over time and represents temporal dependencies, future occurrence of repeating variations of storage-related service usage and requirements can be predicted. The model may be used to generate hardware recommendations and dynamically re-allocate existing hardware resources to more reliably satisfy a predetermined level of measured performance.

20 Claims, 6 Drawing Sheets

DYNAMIC WORKLOAD MANAGEMENT BASED ON PREDICTIVE MODELING AND RECOMMENDATION ENGINE FOR STORAGE SYSTEMS

BACKGROUND

The subject matter of this disclosure is generally related to computer networks in which storage nodes maintain data for host applications that run on servers, e.g. SANs (storage area networks). The storage nodes manage access to host application data that is stored on arrays of non-volatile drives. The managed drives are not discoverable by the servers, but the storage nodes create logical production volumes that are discoverable and accessible. Each production volume is a logical storage device having contiguous fixed-size LBAs (logical block addresses) that map to non-contiguous addresses of the managed drives. The servers send IO (input-output) commands, e.g. SCSI (small computer system interface) commands, to the storage node that reference storage space of the production volume. The storage node uses metadata to access corresponding storage space on the managed drives to service the IO commands. In addition to servicing IO commands such as reads and writes from the servers, the storage nodes may perform other storage-related services such as replication, protection/availability, and space reduction that support host application data but are hidden from the users or hosts.

SUMMARY

All examples, aspects, and features mentioned in this document can be combined in any technically conceivable way.

In accordance with an aspect an apparatus comprises: a storage array comprising: a plurality of interconnected computing nodes, each of the computing nodes comprising at least one processor and non-transitory memory, and a plurality of groups of data storage drives, each group of data storage drives connected with one of the computing nodes, wherein the storage array maintains a production volume comprising contiguous logical block addresses that map to non-contiguous addresses of the data storage drives; and management instructions stored on the non-transitory memory and run on the at least one processor comprising: instructions that identify dependencies between storage array hardware, host-visible storage-related services provided by the storage array, and host-hidden storage-related services provided by the storage array; instructions that generate a model of the storage array from the identified dependencies; and instructions that re-allocate storage array hardware based on the model. Some implementations comprise instructions that monitor operation of the storage array over time to collect information to identify temporal dependencies between the storage array hardware, the host-visible storage-related services provided by the storage array, and the host-hidden storage-related services provided by the storage array. In some implementations the management instructions iteratively update the model based on additional collected information. Some implementations comprise instructions that generate recommendations for changing the storage array hardware based on the model. Some implementations comprise instructions that adjust parameters of the host-visible storage-related services provided by the storage array and the host-hidden storage-related services provided by the storage array. In some implementations the instructions that re-allocate the storage array hardware based on the model calculate multiple allocations of selected hardware features to the host-visible and the host-hidden storage services that maximize benefit and selects an allocation from the multiple allocations to minimize change associated with re-allocation of storage array hardware. In some implementations: the host-visible storage-related services comprise servicing input-output commands from hosts; the host-hidden services comprise replication, protection/availability, and space reduction services; and the storage array hardware for which dependencies are identified comprises fixed-size units of volatile memory capacity and processor cores.

In accordance with an aspect a method comprises: in a storage array comprising a plurality of interconnected computing nodes, each of the computing nodes comprising at least one processor and non-transitory memory, and a plurality of groups of data storage drives, each group of data storage drives connected with one of the computing nodes, wherein the storage array maintains a production volume comprising contiguous logical block addresses that map to non-contiguous addresses of the data storage drives: identifying dependencies between storage array hardware, host-visible storage-related services provided by the storage array, and host-hidden storage-related services provided by the storage array; generating a model of the storage array from the identified dependencies; and re-allocating storage array hardware based on the model. Some implementations comprise monitoring operation of the storage array over time to collect information and identifying temporal dependencies between the storage array hardware, the host-visible storage-related services provided by the storage array, and the host-hidden storage-related services provided by the storage array. Some implementations comprise iteratively updating the model based on additional collected information. Some implementations comprise generating recommendations for changing the storage array hardware based on the model. Some implementations comprise adjusting parameters of the host-visible storage-related services provided by the storage array and the host-hidden storage-related services provided by the storage array. Some implementations comprise calculating multiple allocations of selected hardware features to the host-visible and the host-hidden storage services that maximize benefit and selecting an allocation from the multiple allocations to minimize change associated with re-allocation of storage array hardware.

In accordance with an aspect a non-transitory memory comprises: storage array management instructions comprising: instructions that identify dependencies between storage array hardware, host-visible storage-related services provided by the storage array, and host-hidden storage-related services provided by the storage array; instructions that generate a model of the storage array from the identified dependencies; and instructions that re-allocate storage array hardware based on the model. Some implementations comprise instructions that monitor operation of the storage array over time to collect information to identify temporal dependencies between the storage array hardware, the host-visible storage-related services provided by the storage array, and the host-hidden storage-related services provided by the storage array. In some implementations the management instructions iteratively update the model based on additional collected information. Some implementations comprise instructions that generate recommendations for changing the storage array hardware based on the model. Some implementations comprise instructions that adjust parameters of the host-visible storage-related services provided by the storage array and the host-hidden storage-related services provided by the storage array. In some implementations the instructions that re-allocate the storage array hardware based on the model calculate multiple allocations of selected hardware features to the host-visible and the host-hidden storage services that maximize benefit and selects an allocation from the multiple allocations to minimize change associated with re-allocation of storage array hardware. In some implementations: the host-visible storage-related services comprise servicing input-output commands from hosts; the host-hidden services comprise replication, protection/availability, and space reduction services; and the storage array hardware for which dependencies are identified comprises fixed-size units of volatile memory capacity and processor cores.

Other aspects, features, and implementations may become apparent in view of the detailed description and figures.

DETAILED DESCRIPTION

Some aspects, features, and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor hardware components. For ease of exposition, not every step, device, or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The terms "physical" and "real" are used to refer to tangible features. For example, a virtual storage device could be based on multiple physical storage drives. The term "logic" is used to refer to one or more of special purpose electronic hardware and software instructions that are stored on a non-transitory computer-readable medium and implemented by general-purpose tangible processors.

Figure 1:
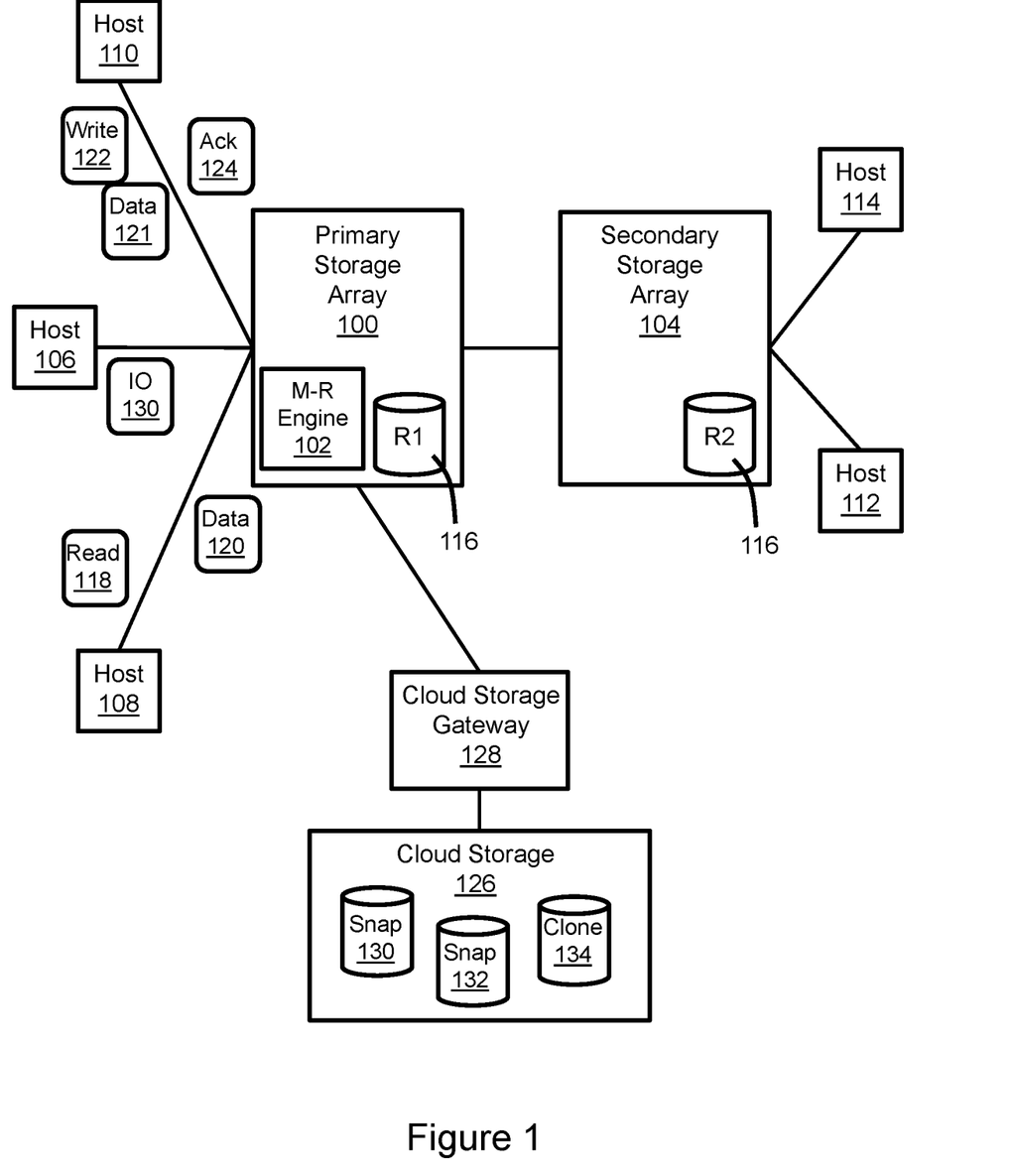
FIG. 1 illustrates a computer network in which a storage array includes a M-R (modelling and recommendation) engine for dynamic workload management.

FIG. 1 illustrates a computer network in which an M-R (modelling and recommendation) engine running on a storage array provides dynamic workload management for the storage array. The illustrated network includes a primary storage array 100, a secondary storage array 104, hosts 106, 108, 110, 112, and 114, a cloud storage gateway 128, and cloud storage 126. The terms "storage array" and "host" are intended to be interpreted broadly and include any types of nodes with which the disclosed inventive features can be implemented. The primary storage array 100 is designated as the "primary" based on having preferential IO bias over the secondary storage array 104 for purposes of conflict resolution. In the illustrated example M-R engine 102 provides dynamic workload management for the primary storage array 100.

The primary storage array 100 performs a variety of storage-related services that are visible to the connected hosts 106, 108, 110. With respect to host-visible storage protocol communications (e.g. SCSI communications), the hosts are IO initiators and the primary storage array is an IO target. For example, host 106 can access a replicated production volume 116 by sending an IO 130 to the primary storage array 100. IOs can include commands to read and write data. In response to a read command 118 from host 108 the primary storage array returns corresponding data 120 from the production volume 116. In response to a write command 122 from host 110 the primary storage array writes corresponding data 121 to the production volume 116 and returns an Ack (acknowledgement) 124 to the host 110.

The primary storage array 100 also performs a variety of storage-related services that are hidden from the hosts. Types of host-hidden services include replication, protection/availability, and space reduction. Specific examples of replication include remote and local replication of logical storage volumes such as production volume 116. In the illustrated example the primary storage array 100 maintains a first replica (R1) of the production volume 116 and the secondary storage array 104 maintains a remote second replica (R2) of the production volume 116. In an active-passive mode all IOs are directed to R1. R2 is undiscoverable and inaccessible by the hosts in active-passive mode. Changes to the production volume are implemented by the primary storage array and asynchronously propagated to the secondary storage array so that completion of IOs is not delayed by synchronization of replicas. In an active-active mode R1 and R2 are both discoverable and accessible. In the illustrated example R2 would become discoverable and accessible by hosts 112, 114. Changes to R1 and R2 are synchronized in active-active mode so that hosts do not access inconsistent data from different replicas. Protection services may include creation of backup or archival copies of data on another node. In the illustrated example the primary storage array 100 accesses cloud storage 126 via a cloud gateway 128 to store snaps 130, 132 and a clone 134 of the production volume 116. Other examples of protection/availability include RAID (redundant array of independent disks), encryption, storage tiering, and cache management. Specific examples of space reduction include deduplication, compression, and thin provisioning.

Figure 2:
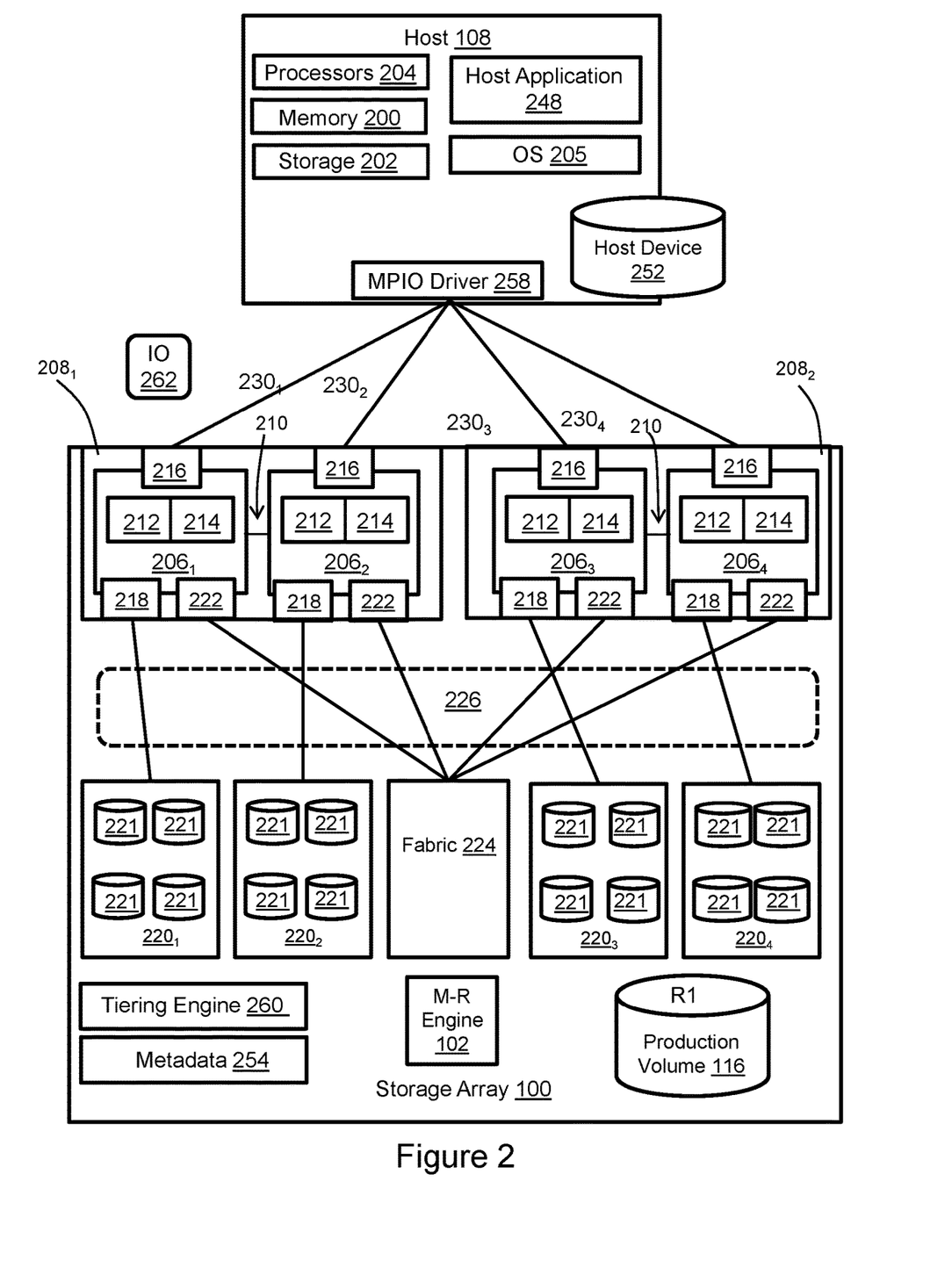
FIG. 2 illustrates aspects of the primary storage array of FIG. 1 in greater detail.

FIG. 2 illustrates aspects of the primary storage array 100 in greater detail. In the illustrated example the primary storage array 100 includes a plurality of computing nodes $206_1$-$206_4$. Pairs of the computing nodes, e.g. ($206_1$, $206_2$) and ($206_3$, $206_4$), may be organized as storage engines $208_1$, $208_2$, respectively, that provide failover protection between paired computing nodes. The paired computing nodes of each storage engine may be directly interconnected by communication links 210. Each computing node includes at least one tangible multi-core processor 212 and a local volatile memory 214. Each multi-core processor may be a single computing component, chip package, or semiconductor die with a plurality of independent processing units called cores. Each core is capable of reading and executing instructions. The processors 212 may include both CPUs and GPUs. The local volatile memory 214 may include, for example and without limitation, components such as RAM (random access memory) of any type. Each computing node may include one or more FAs 216 (front-end adapters) for communicating with the hosts, e.g. host 108. Each computing node $206_1$-$206_4$ may also include one or more BAs 218 (back-end adapters) for communicating with respective associated back-end storage bays $220_1$-$220_4$, thereby enabling access to managed drives 221. The managed drives 221 may include tangible persistent storage components of one or more technology types, for example and without limitation SSDs (solid state drives) such as flash, and HDDs (hard disk drives) such as SATA (Serial Advanced Technology Attachment) and FC (Fibre Channel). Each computing node may also include one or more CAs (channel adapters) 222 for communicating with other computing nodes via an interconnecting fabric 224. Each computing node may allocate a portion or partition of its respective local volatile memory 214 to a virtual shared memory (cache) 226 that can be accessed by other computing nodes, e.g. via DMA (direct memory access) or RDMA (remote direct memory access).

Host 108, like the other hosts, may be a server that supports multiple instances of a host application 248. In the illustrated example the host includes processors 204, volatile memory 200, non-volatile storage 202, and an OS (operating system) or hypervisor 205. Examples of host applications may include databases, email servers, file servers, and block servers, for example, and without limitation. The host application uses the production volume 116 for storage of host application data. For example, the host application may write host application data to the production volume and read host application data from the production volume in order to perform various functions. Instances of the host application running on multiple hosts may use the same production volume and the same data. Without limitation, the production volume 116 may be referred to as a production device or production LUN, where LUN (Logical Unit Number) is a number used to identify the logical storage volume in accordance with the SCSI protocol. Host device 252 is a representation of the production volume 116 that is local to the host. The host device 252 and the production volume 116 represent abstraction layers between the managed drives 221 and the host application 248. From the perspective of the host application 248, the host device 252 is a single data storage device having a set of contiguous fixed-size LBAs on which data used by the host application resides. However, the data used by the host application may actually be maintained by the computing nodes $206_1$-$206_4$ at non-contiguous addresses on various different managed drives 221. Moreover, each host may maintain its own host device that represents the production volume.

In order to service IOs from the host application 248, the storage array 100 maintains metadata 254 that indicates, among various things, mappings between production volume 116 storage space and the locations of extents of host application data on the managed drives 221. In response to an IO from the host application 248 to host device 252, an MPIO (Multi-Path Input-Output) driver 258 may determine whether the IO can be serviced by accessing the host computer memory 200. If that is not possible then the MPIO driver generates IO 262 with reference to production device 116 and selects a path on which to send the IO 262. There are multiple paths $230_1$-$230_4$ between the host computer 102 and the storage array 100, e.g. one path per FA 216, and there could be paths to other storage arrays. Each path may have a locally unique address that is known to the MPIO driver 258. However, the host application is not aware of the paths and addresses because it views the host device 252, and thus the production volume, as being available via a single logical path. The paths may be selected by the MPIO driver based on a wide variety of techniques and algorithms including, for context and without limitation, performance and load balancing. In the case where IO 262 includes a read command the storage array uses the metadata 254 to locate the requested data. If the requested data is not in the shared memory 226 then the data is temporarily copied into the shared memory from the managed drives 221 and sent to the host application via one of the computing nodes. In the case where IO 262 includes a write command the storage array marks the data as dirty and creates new metadata that maps the production device address with a location to which the data is written on the managed drives. Data being written is initially stored in the shared memory and later de-staged to the managed drives. The shared memory 226 may enable the production device 116 to be reachable via all of the computing nodes and paths, although the storage array can be configured to limit use of certain paths to certain production devices.

Both the host-visible and host-hidden storage-related services require use of some of the hardware resources of the storage array. For example, servicing IOs requires computing node processing resources such as processor cores, memory resources such as cache slots of the shared memory, FA ports, and storage space (e.g. blocks) on the managed drives. Replication requires communication of commands and data between the primary and secondary storage arrays, in addition to the computing node processing and memory resources, ports, and managed drives. Similarly, backup operations require internal hardware resources and communication of commands and data between the primary storage array and the cloud gateway. Encryption, deduplication, and compression each require processor resources to regenerate data that has been encrypted, deduplicated, or compressed. If storage tiering is implemented, a storage tiering engine 260 requires processing resources to determine relative activity levels of extents of data, and memory and storage resources to dynamically promote and demote extents between higher and lower performing managed drives as relative activity levels of extents change over time.

The performance of the primary storage array may be measured based on the host-visible storage-related services such as servicing IOs. From the perspective of a user, customer, subscriber, or other entity, the performance or QoS (quality of service) provided by the primary storage array may be measured in terms of one or more of: IOPS (number of IOs per second serviced), data throughput, latency between read command and return of data, and latency between write command and Ack. Although a user, customer, or subscriber may be aware of the existence of host-hidden services, those host-hidden services may not be required for normal host operation and are not directly considered in the measurement of storage array performance. For example, and without limitation, snapshot generation for data backup purposes may be desired by a customer, but performance as specified in an SLO (service level obligation) demanded by the customer may be expressed in terms of IOPS to hosts. Thus, any storage-related service that is not directly measured to determine storage array performance may be considered as host-hidden.

Figure 3:
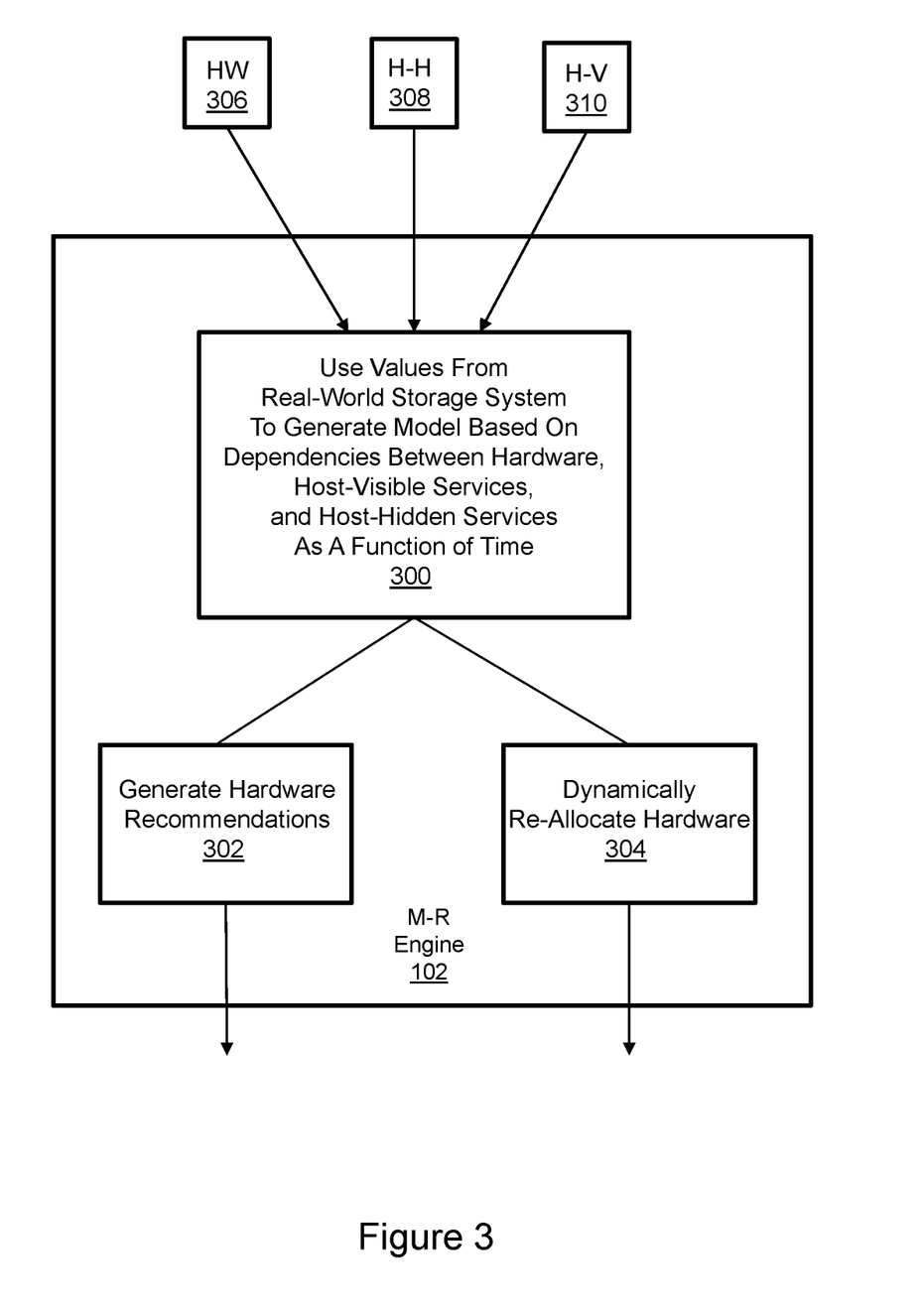
FIG. 3 is a flow diagram of operation of the M-R engine.

Referring to FIGS. 1 and 3, the M-R engine 102 may improve the measured performance of the primary storage array 100 by managing allocation of hardware resources between host-visible and host-hidden services, e.g. ensuring that sufficient hardware resources are allocated to host-visible services to satisfy an SLO. The M-R engine uses information obtained from monitoring real-world operation of the storage array, such as the servicing IOs from hosts and performing other services, to generate a model of the storage array as indicated in step 300. Specifically, the generated model represents temporal dependencies between storage array hardware 306, host-visible services 310, and host-hidden services 308. Because the model is based on values obtained from monitoring real-world operation of the storage array the model is specifically representative of the monitored storage array, as opposed to being generic. For example, the model may be viewed as implementation-specific. Moreover, because the model includes information gathered over time and represents temporal dependencies, future occurrence of repeating variations of storage-related service usage and requirements can be predicted. As indicated in step 302, the model may be used to generate hardware recommendations. For example, and without limitation, the model may suggest changes and improvements for specific hardware resources of the storage array, such as increased shared memory capacity, additional storage engines, additional non-volatile storage capacity of a particular performance type (e.g. SSD), additional processors, and any of a variety of other improvements and hardware resources that would more reliably satisfy a predetermined level of measured performance. As indicated in step 304, the model may be used to dynamically (changing over time during normal operation, possibly in response to an input) re-allocate existing hardware resources to more reliably satisfy a predetermined level of measured performance. For example, and without limitation, the model could be used to re-allocate shared memory capacity, ports, storage engines, and processor cores for servicing IOs rather than host-hidden services at times when resource constraints might otherwise cause measured performance to fall below a target level. Because the model includes temporal dependencies, re-allocation may be performed based on satisfaction of predicted requirements to satisfy a predetermined level of measured performance.

Figure 4:
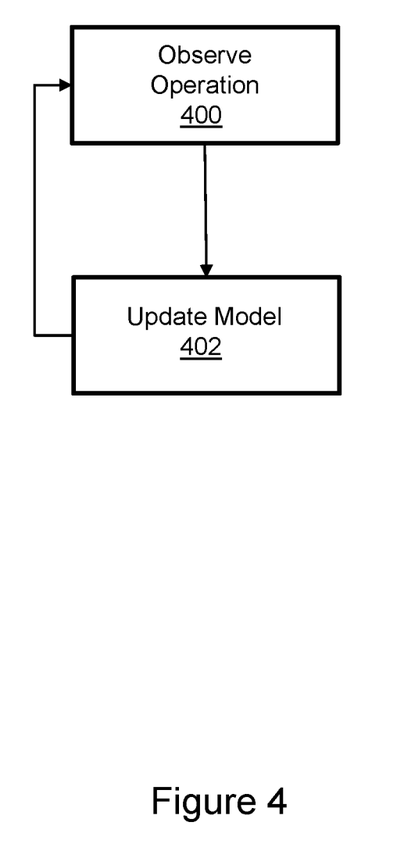
FIG. 4 is a flow diagram of model generation.

FIG. 4 is a flow diagram of model generation. In this implementation the M-R engine observes operation of the storage array as indicted at step 400. Information gathered from observations is used to update the model as indicated in step 402. Aspects of storage array hardware, host-visible services, and host-hidden services may be observed. For example, at various sample times the number and types of active host-visible and host-hidden services could be recorded, as well as the allocations of hardware features to each of those services. The process is iterative, so the model is repeatedly updated based on additional information from observations. Machine learning techniques may be used to generate and update the model from the observations.

Figure 5:
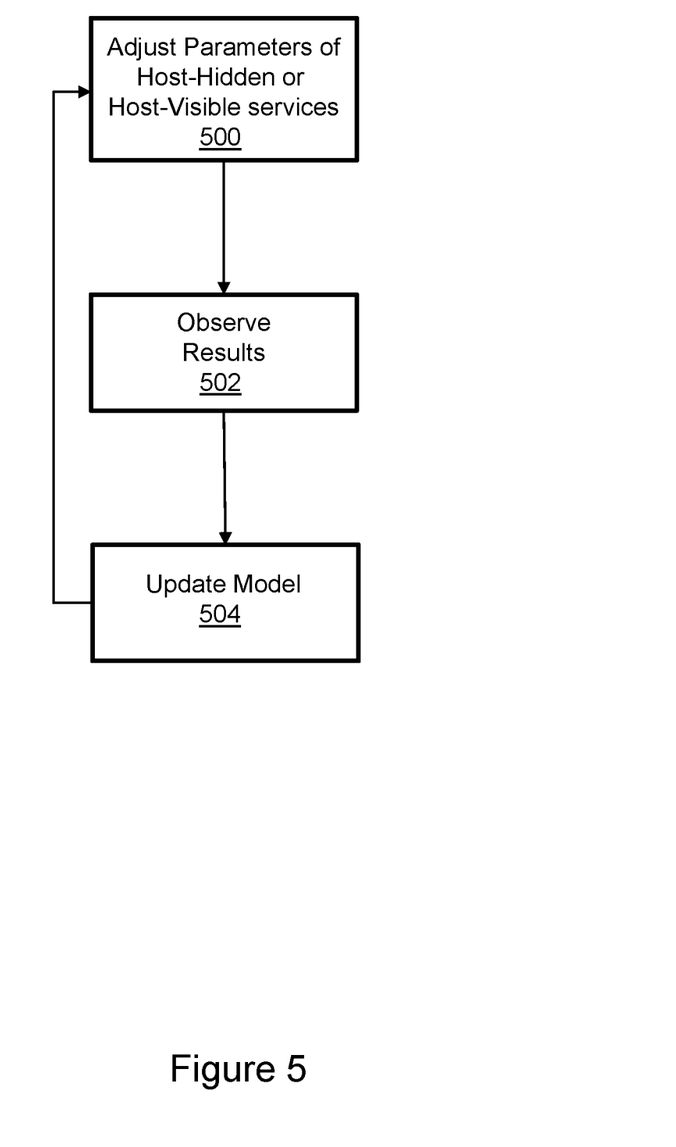
FIG. 5 illustrates another aspect of model generation.

FIG. 5 illustrates another aspect of model generation. Observations gathered over time will naturally include a variety of different conditions. However, some inputs and configuration settings may be static or limited by configuration programs, thereby limiting the diversity of observations. The host-hidden and host visible storage services include parameters that are configured by inputs and configuration settings that may be controlled by the storage array. The M-R engine may therefore be enabled to adjust the parameters of the host hidden storage services and host-visible storage services as indicated at step 500. The M-R engine observes the results as indicated in step 502 and updated the model accordingly in step 504. The process is iterative, so the parameters may be repeatedly adjusted by the M-R engine. Adjustments may be calculated as a function of the observed results. This technique can improve the model and help to improve dynamic reallocation of hardware resources.

Figure 6:
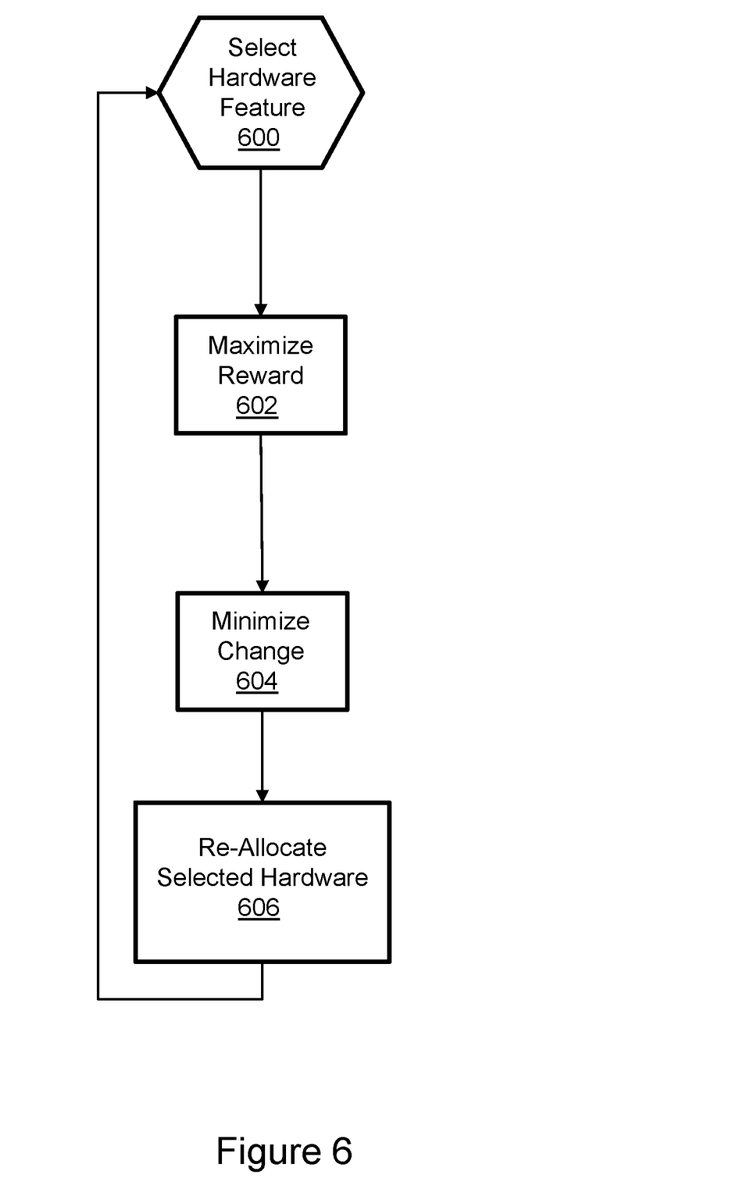
FIG. 6 illustrates dynamic re-allocation of hardware in greater detail.

FIG. 6 illustrates dynamic re-allocation of storage array hardware in greater detail. A hardware feature is selected for processing as indicated in step 600. For example, the selected hardware feature could be processor cores, fixed-size units of memory capacity, number of ports, number of storage engines, fixed-size units of high-performance managed drives, or some other feature. The M-R engine calculates allocations of the selected hardware feature to host-visible and host-hidden storage services that maximize reward (value) as indicated in step 602. Reward value is characterized in terms of benefit obtained by allocating one hardware feature unit, e.g. one processor core, to the selected storage service. The M-R engine then selects a reward-maximizing allocation that minimizes change associated with re-allocation as indicated in step 604. The selected hardware feature is then re-allocated in accordance with the calculations as indicated in step 606. The process is iterative, so other hardware features are re-allocated when selected, and each hardware feature is repeatedly re-allocated unless calculations indicate that the allocation should remain static.

The M-R engine may use statistical methods such as ARIMA (AutoRegressive Integrated Moving Average), ARMA (AutoRegressive Moving Average), and MA (Moving Average) for time-series analysis to predict a future workload, e.g. in terms of TOPS or read+write commands. Such predictions may be used to simulate and determine an optimal hardware configuration for the storage array. Once the feature and service variables are determined with reasonable confidence, resources may be allocated, e.g. a sufficient number of cores for serving predicted IOPS. As mentioned above, a multi-objective formulation allocates a hardware feature such as processor cores to various storage-related services such that change, e.g. number of cores reallocated, is minimized and the returned reward is maximized. A constraint in one implementation is as follows:

$$\Sigma_{i=1}^{i=n}(t) + \_m(t) \le m$$

where:
n is the total number of host-hidden storage services running;
m is the total number of the selected hardware feature (e.g. processor cores) available in the storage array;
$u_i(t)$ is the number of cores allocated to task i at time t; and
Vm is the number of the selected hardware feature required to service host IOs in the given interval.
Vm may be influenced by the workload prediction from the statistical models. As indicated, the total number of units of the selected hardware feature allocated to all host-hidden storage services and host-visible storage services should be less than or equal (typically equal) to the maximum number of units of the selected hardware feature available in the storage array.

Any integer programming formulation describes one or more objective functions to be optimized, i.e. either maximized or minimized. Additionally, some constraints may be provided which inform the limit of different variables and may model real-life requirements that must be met while optimizing the objective. In the illustrated example the objective function is twofold: first maximize the returned reward and then minimize the number of feature reallocations in different host-hidden storage services. Based on the reward value and number of available units of the selected hardware feature there may be multiple configurations of host-hidden storage services that satisfy the initial objective. Changing the hardware feature allocation can be a costly operation in terms of transient utilization, losing cached data, losing affinity, and context switches, so the configuration characterized by minimum changes is selected. One example of a corresponding objective function is as follows:

$$\max(\Sigma_{i=1}^{i=n} R_i(t)*u_i(t)) \text{ then } \min \Sigma_{i=1}^{i=n} \mod(u_i(t)-u_i(t-1)),$$

where $R_i(t)$ is the reward received when task i is allocated one hardware feature unit for its execution in the beginning of a decision-making time period of duration $\Delta t$. The total reward obtainable from the next configuration which would be valid for the duration of $t+\Delta t$ is maximized. The reward value is multiplied by the total number of selected hardware feature units allocated to produce a net benefit offered by allocating $u_i(t)$ hardware feature units to a host-hidden storage process i. The second objective is to minimize the configuration change, which is calculated by taking an absolute sum of the difference of the number of hardware feature units allocated in the previous and current duration for all n storage-related service processes.

Rewards (R) provide a flexible way of defining priorities and a timeline of a storage-related process. If a process requires an immediate CPU allocation, its rewards would be set to a high value so that the integer programming solver will choose a high value of $u_i(t)$ so that objective is maximized. Similarly, if a storage-related process needs to be terminated/blocked then setting its reward to zero would indicate that hardware features should not be allocated to that process for a given decision making time period. If all processes need an equal share of a hardware feature, then the rewards for all processes would be set to the same value. Process rewards thus provide a way of declaring priorities and can work as a tool to enforce a timing order or CPU execution time duration.

A similar integer programming framework can be abstracted and used at multiple nodes in a storage system, e.g. deployed for other hardware resources or virtual resources where the facility of movement/migration is available. Similarly, variables can also be abstracted to the level of implementation, e.g. rewards need not be defined per process level; instead they can be defined at the level of "group of processes" or emulation. Such formulations can be used in dynamic workload allocation and balancing in data centers or storage systems. When a cluster of multiple storage systems has many different entities, an IO can be served from many different storage units. In such scenarios an integer programming workload balancing system based on "rewards" per storage system and constraints of "similar load on each unit" or "no one system loaded/bottleneck" can be implemented.

A number of features, aspects, examples, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. Apparatus comprising:
a storage array comprising:
a plurality of interconnected computing nodes, each of the computing nodes comprising at least one processor and non-transitory memory, and a plurality of groups of data storage drives, each group of data storage drives connected with one of the computing nodes, wherein the storage array maintains a production volume comprising contiguous logical block addresses that map to non-contiguous addresses of the data storage drives; and
management instructions stored on the non-transitory memory and run on the at least one processor comprising:
instructions that identify dependencies between storage array hardware, host-visible storage-related services provided by the storage array, and host-hidden storage-related services provided by the storage array;
instructions that generate a model of the storage array from the identified dependencies; and
instructions that re-allocate storage array hardware based on the model.

2. The apparatus of claim 1 further comprising instructions that monitor operation of the storage array over time to collect information to identify temporal dependencies between the storage array hardware, the host-visible storage-related services provided by the storage array, and the host-hidden storage-related services provided by the storage array.

3. The apparatus of claim 2 wherein the management instructions iteratively update the model based on additional collected information.

4. The apparatus of claim 1 further comprising instructions that generate recommendations for changing the storage array hardware based on the model.

5. The apparatus of claim 1 further comprising instructions that adjust parameters of the host-visible storage-related services provided by the storage array and the host-hidden storage-related services provided by the storage array.

6. The apparatus of claim 1 wherein the instructions that re-allocate the storage array hardware based on the model calculates multiple allocations of selected hardware features to the host-visible and the host-hidden storage services that maximize benefit and selects an allocation from the multiple allocations to minimize change associated with re-allocation of storage array hardware.

7. The apparatus of claim 1 wherein:
the host-visible storage-related services comprise servicing input-output commands from hosts;
the host-hidden services comprise replication, protection/availability, and space reduction services; and
the storage array hardware for which dependencies are identified comprises fixed-size units of volatile memory capacity and processor cores.

8. A method comprising:
in a storage array comprising a plurality of interconnected computing nodes, each of the computing nodes comprising at least one processor and non-transitory memory, and a plurality of groups of data storage drives, each group of data storage drives connected with one of the computing nodes, wherein the storage array maintains a production volume comprising contiguous logical block addresses that map to non-contiguous addresses of the data storage drives:
identifying dependencies between storage array hardware, host-visible storage-related services provided by the storage array, and host-hidden storage-related services provided by the storage array;

generating a model of the storage array from the identified dependencies; and re-allocating storage array hardware based on the model.

9. The method of claim 8 further comprising monitoring operation of the storage array over time to collect information and identifying temporal dependencies between the storage array hardware, the host-visible storage-related services provided by the storage array, and the host-hidden storage-related services provided by the storage array.

10. The method of claim 9 further comprising iteratively updating the model based on additional collected information.

11. The method of claim 8 further comprising generating recommendations for changing the storage array hardware based on the model.

12. The method of claim 8 further comprising adjusting parameters of the host-visible storage-related services provided by the storage array and the host-hidden storage-related services provided by the storage array.

13. The method of claim 8 further comprising calculating multiple allocations of selected hardware features to the host-visible and the host-hidden storage services that maximize benefit and selecting an allocation from the multiple allocations to minimize change associated with re-allocation of storage array hardware.

14. A non-transitory memory comprising:
storage array management instructions comprising:
instructions that identify dependencies between storage array hardware, host-visible storage-related services provided by the storage array, and host-hidden storage-related services provided by the storage array;
instructions that generate a model of the storage array from the identified dependencies; and
instructions that re-allocate storage array hardware based on the model.

15. The non-transitory memory of claim 14 further comprising instructions that monitor operation of the storage array over time to collect information to identify temporal dependencies between the storage array hardware, the host-visible storage-related services provided by the storage array, and the host-hidden storage-related services provided by the storage array.

16. The non-transitory memory of claim 15 wherein the management instructions iteratively update the model based on additional collected information.

17. The non-transitory memory of claim 14 further comprising instructions that generate recommendations for changing the storage array hardware based on the model.

18. The non-transitory memory of claim 14 further comprising instructions that adjust parameters of the host-visible storage-related services provided by the storage array and the host-hidden storage-related services provided by the storage array.

19. The non-transitory memory of claim 14 wherein the instructions that re-allocate the storage array hardware based on the model calculates multiple allocations of selected hardware features to the host-visible and the host-hidden storage services that maximize benefit and selects an allocation from the multiple allocations to minimize change associated with re-allocation of storage array hardware.

20. The non-transitory memory of claim 14 wherein:
the host-visible storage-related services comprise servicing input-output commands from hosts;
the host-hidden services comprise replication, protection/availability, and space reduction services; and
the storage array hardware for which dependencies are identified comprises fixed-size units of volatile memory capacity and processor cores.

* * * * *